(No Model.)

J. H. ANTHONY.
BEADING CUTTER.

No. 378,159. Patented Feb. 21, 1888.

Witnesses
A. Ruppert
E. W. B. Phillips

Inventor
J. H. Anthony
Per
Thomas P. Simpson

UNITED STATES PATENT OFFICE.

JOHN HENRY ANTHONY, OF GARLAND, TENNESSEE.

BEADING-CUTTER.

SPECIFICATION forming part of Letters Patent No. 378,159, dated February 21, 1888.

Application filed October 5, 1887. Serial No. 251,519. (No model.)

*To all whom it may concern:*

Be it known that I, JOHN HENRY ANTHONY, of Garland, Tipton county, Tennessee, have invented an Improved Bead-Cutter for Wood-Work, of which the following is a specification.

The invention relates to the beading-tools employed on planer-cylinders to cut a high round bead, as contradistinguished from a flat one, on wooden material.

Figure 1:
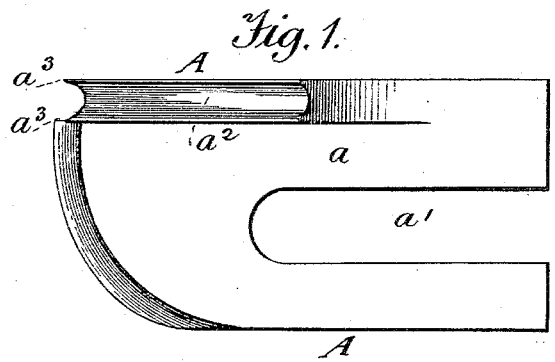
Figure 2:
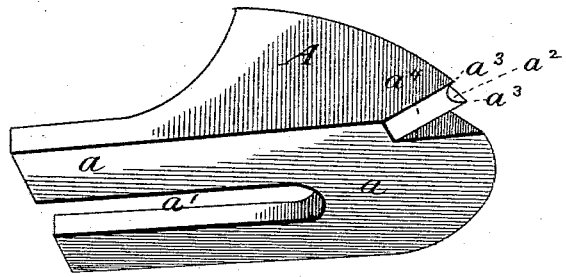
Figure 3:
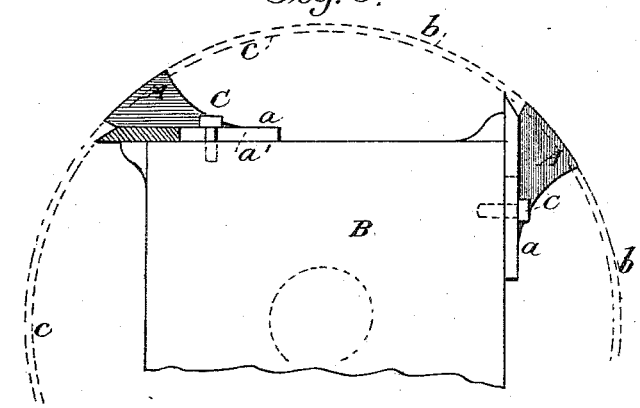

Figure 1 of the drawings is a plan view, Fig. 2 an elevation in perspective, and Fig. 3 an elevation, of the cylinder or cutter head with the cutters attached.

In the drawings, A represents the cutter, having the flat shank $a$ in a plane at right angles to the plane of the cutter and open-slotted at $a'$, so as to allow it to be bolted to the planer-cylinder B by a bolt, C. Of the circular, parallel, and concentric lines $b\ c$, the former indicates the line of cut and the latter the running-line, the two lines being preferably distant about the one-sixteenth of an inch from each other.

The cutter A is made of steel and in one piece with its flat shank $a$ for strength, so that it will not be broken off by loose knots, pieces of board, or any other obstruction, while its groove $a^2$ will be limited by the thickness of the cutter and the size of the bead which it is intended to cut. The groove $a^2$ is not only longitudinally and transversely curved, but made high and round to correspond with the intended bead.

The front end of the cutter is formed with a plane surface or face, $a^4$, intersecting the grooved working-face at a suitable angle to form with the edges of the groove the cutting-points $a^3\ a^3$.

In order to sharpen the cutting-points $a^3\ a^3$, the surface $a^4$ is filed down, thus causing the wear to be uniform and the shape of cutter to be preserved until it is used up.

What I claim as new, and desire to protect by Letters Patent, is—

The described beading-cutter provided with a shank for attachment to a cylinder, a grooved and longitudinally-curved working-face, and in front with a filing-face intersecting the groove and forming therewith cutting-points, substantially as and for the purpose set forth.

JOHN HENRY ANTHONY.

Witnesses:
S. LONG,
I. N. GLASS.